United States Patent
Park et al.

(10) Patent No.: US 9,458,308 B1
(45) Date of Patent: Oct. 4, 2016

(54) POLYCARBONATE RESIN COMPOSITION WITH INCREASED GAMMA-RADIATION RESISTANT PROPERTY AND MOLDED ARTICLE USING THE SAME

(71) Applicant: LOTTE CHEMICAL CORPORATION, Seoul (KR)

(72) Inventors: Young Kwan Park, Daejeon (KR); Byung Hoon Lim, Daejeon (KR); Jin Ho Kim, Daejeon (KR); Byoung Ok Jang, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 14/709,533

(22) Filed: May 12, 2015

(51) Int. Cl.
*C08K 5/36* (2006.01)
*C08K 5/20* (2006.01)

(52) U.S. Cl.
CPC .. *C08K 5/36* (2013.01); *C08K 5/20* (2013.01)

(58) Field of Classification Search
CPC ................................... C08K 5/36; C08K 5/20
See application file for complete search history.

(56) References Cited

U.S. PATENT DOCUMENTS

| | | | |
|---|---|---|---|
| 7,511,092 B2 | 3/2009 | Glasgow et al. | |
| 2007/0037906 A1* | 2/2007 | Kawato | C08K 5/50 524/154 |
| 2009/0326120 A1* | 12/2009 | Kawagoshi | C08G 77/04 524/267 |
| 2010/0029812 A1* | 2/2010 | Tanabe | C08K 5/005 524/91 |
| 2014/0027686 A1* | 1/2014 | Togashi | C08K 5/357 252/587 |

FOREIGN PATENT DOCUMENTS

| | | | | |
|---|---|---|---|---|
| CN | 103937186 | * | 7/2014 | .............. C08L 69/00 |
| JP | 2014-058322 | * | 4/2014 | .............. B65D 1/00 |
| KR | 10-2008-0012797 A | | 2/2008 | |

OTHER PUBLICATIONS

Machine translation of JP 2014-058322. Apr. 2014.*

* cited by examiner

*Primary Examiner* — John Uselding
(74) *Attorney, Agent, or Firm* — Paratus Law Group, PLLC

(57) ABSTRACT

Disclosed are a polycarbonate resin composition as a polycarbonate material for medical use having yellowing resistant property with respect to the irradiation of gamma-radiation, which exhibits extremely little yellowing during sterilizing using the gamma-radiation, maintains transparency and has no mechanical change, and a molded article using the same. The present invention provides a polycarbonate resin composition including a polycarbonate resin, a thioether-based stabilizer and an amide-based stabilizer, and a molded article using the same.

5 Claims, No Drawings

POLYCARBONATE RESIN COMPOSITION WITH INCREASED GAMMA-RADIATION RESISTANT PROPERTY AND MOLDED ARTICLE USING THE SAME

BACKGROUND

The present disclosure relates to a polycarbonate resin composition and a molded article using the same, and more particularly, to a polycarbonate resin composition with increased gamma-radiation resistant property and a molded article using the same.

A polycarbonate resin is known to be appropriate in diverse applications in medical field due to good physical and mechanical properties.

However, in the case that sterilization via exposure to gamma-radiation is required, the polycarbonate resin is liable to change yellow and the clarity thereof is lowered, and techniques for imparting gamma-radiation resistant property by adding a stabilizer are disclosed.

For example, U.S. Pat. No. 7,511,092 discloses a technique using a phthalate-based compound as a stabilizer for preventing the yellowing of polycarbonate due to exposure to gamma-radiation. However, a phthalate-based monomer compound is recently designated as an endocrine disruptor and a harmful compound in Europe, etc.

In addition, Korean Laid-open Patent Publication No. 2008-0012797 discloses a technique using brominated bisphenol A including a halogen atom in place of bisphenol A forming the backbone of polycarbonate, however the halogen atom is currently classified as a harmful material in America, Europe, etc.

Therefore, the development of a polycarbonate resin composition using a stabilizer without a harmful compound so as to improve yellowing resistant property of a resin and a molded article during sterilization using gamma-radiation and secure transparency, is really in need.

SUMMARY

The present disclosure for solving the above-mentioned defects provides a polycarbonate resin composition as a polycarbonate material for medical use having yellowing resistant property with respect to the irradiation of gamma-radiation, which exhibits extremely little yellowing during sterilizing using the gamma-radiation, maintains transparency and has no mechanical change.

In addition, the present disclosure also provides a polycarbonate resin composition with low production cost per unit by using an economic stabilizer when compared to a saccharin-based additive used as a harmless material.

In addition, the present disclosure also provides a molded article for a medical device with good gamma-radiation resistant property including the polycarbonate resin composition.

In accordance with an exemplary embodiment of the present invention, there is provided a polycarbonate resin composition including a polycarbonate resin, a thioether-based stabilizer and an amide-based stabilizer.

In addition, there is provided a polycarbonate resin composition in which the polycarbonate resin composition may include 96 to 99.8 wt % of the polycarbonate resin, 0.1 to 2 wt % of the thioether-based stabilizer and 0.1 to 2 wt % of the amide-based stabilizer.

In addition, there is provided a polycarbonate resin composition in which a weight average molecular weight of the polycarbonate resin may be 2,000 to 200,000.

In addition, there is provided a polycarbonate resin composition in which the polycarbonate resin may be a single polycarbonate resin or a mixture with polymethylmathacrylate (PMMA) or polyethylene terephthalate (PET).

In addition, there is provided a polycarbonate resin composition in which the thioether-based stabilizer may be represented by the following Formula 1.

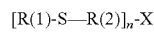
[Formula 1]

in Formula 1, R(1) and R(2) are each independently represents a substituted or unsubstituted carboxylic or heterocyclic aromatic ring, hydroxyl substituted phenylene or naphthalene, an alkyl group with 1 to 20 carbon atoms or a phenyl group, and n is an integer of 1 to 4, where n is 2 to 4, X is an alkyl group with 1 to 5 carbon atoms, an aromatic or nonaromatic ring, oxygen (O), nitrogen (N), phosphor (P) or sulfur (S).

In addition, there is provided a polycarbonate resin composition in which the thioether-based stabilizer may be at least one selected from the group consisting of propanoic acid, 3-(dodecylthio)-1,1'-[2,2-bis[[3-(dodecylthio)-1-oxopropoxy]methyl]-1,3-propanediyl]ester, 2,2-bis[[3-(dodecylthio)-1-oxopropoxy]methyl]propane-1,3-diyl bis[3-(dodecylthio)propionate], tetrakis[methylene-3-(dodecylthio) propionate]-methane, pentaerythritol tetrakis (dodecylthiopropionate) and 2,2-bis[[3-(dodecylthio)-1-oxopropoxy]methyl]propane-1,3-diyl, bis[3-(dodecylthio)-propionate.

In addition, there is provided a polycarbonate resin composition in which the amide-based stabilizer may be represented by the following Formula 2.

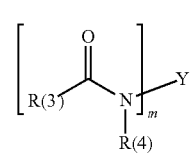
[Formula 2]

In Formula 2, R(3) and R(4) are each independently a substituted or unsubstituted carboxylic or heterocyclic aromatic ring, hydroxyl substituted phenylene or naphthalene, an alkyl group with 1 to 20 carbon atoms or a phenyl group, and m is an integer of 1 to 2, where m is 1, Y is a substituted or unsubstituted carboxylic or heterocyclic aromatic ring, hydroxyl substituted phenylene or naphthalene, an alkyl with 1 to 20 carbon atoms or a phenyl group, and where m is 2, Y is an alkyl group with 1 to 10 carbon atoms, a nonaromatic ring or an aromatic ring.

In addition, there is provided a polycarbonate resin composition in which the amide-based stabilizer may be N,N'-ethylenedi(stearamide).

In accordance with another exemplary embodiment of the present invention, a molded article molded from the polycarbonate resin composition is provided.

According to the polycarbonate resin composition and the molded article using the same, a resin composition maintaining the transparency of the polycarbonate resin and having improved gamma-radiation resistant property, and a material for a medical product and a medical device with markedly improved yellowing property during sterilization may be provided by excluding a stabilizer including a harmful component added to improve the yellowing property and transparency of a common polycarbonate resin during sterilizing via the irradiation of the gamma-radiation but including a sulfur-based stabilizer and an amide-based stabilizer with good gamma-radiation resistant property.

DETAILED DESCRIPTION OF EMBODIMENTS

Hereinafter, preferred embodiments of the present invention will be described in detail. In the description of the present invention, in the case that particular explanation on known techniques is considered to obscure the gist of the present invention, the detailed description thereof will be omitted. It will be understood that when a part "includes" an element, the part may not exclude other elements but may further include other elements throughout, unless the context clearly indicates otherwise.

The inventors of the present invention repeated close studies on a stabilizer with good gamma-radiation resistant property, which may be used instead of a stabilizer obtained using a harmful component added to improve the yellowing property and transparency of a common polycarbonate resin requiring sterilization using the irradiation of gamma-radiation and may produce an economic polycarbonate resin, found that the yellowing property during sterilization may be markedly improved by providing a resin composition maintaining the transparency of the polycarbonate resin and improving gamma-radiation resistant property by adding a specific thioether-based stabilizer and an amide-based stabilizer and realized the present invention.

Thus, the present invention discloses a polycarbonate resin composition including a polycarbonate resin, a thioether-based stabilizer and an amide-based stabilizer.

Hereinafter, each constituting component of the polycarbonate resin composition according to the present invention will be described in more detail.

(A) Polycarbonate Resin

A polycarbonate (PC) resin used in the present invention is an amorphous polymer having good transparency, impact resistance, self-extinguishability, flexibility and processability, and maintains good physical properties for a long time due to excellent climate-resistance, and the performance thereof in conditions of severe changes of the temperature due to excellent heat-resistance and cold-resistance. In the present invention, particularly, the polycarbonate resin may be included in an amount of 96 to 99.8 wt %, preferably, 98 to 99.7 wt %, and more preferably, 99 to 99.5 wt % for the balance of physical properties such as the yellowing property, transparency improvement, processability, etc. of a final polycarbonate resin in consideration of the addition of a stabilizer which will be described later.

In addition, the polycarbonate resin according to an embodiment of the present invention may have a weight average molecular weight of 10,000 to 200,000 and may preferably have 15,000 to 80,000. In addition, a polycarbonate resin with a branched-chain may be used, and preferably, a polycarbonate resin prepared by adding 0.05 to 2 mol % of a polyfunctional compound having tri- or more functional groups such as a compound having phenol groups of three or more on the basis of the total amount of a diphenol used for polymerization may be used.

Meanwhile, the polycarbonate resin used in the present invention may be prepared by a commonly used preparation method, for example, may be prepared by reacting dihydroxy phenol and phosgene in the presence of a molecular weight control agent and a catalyst or may be prepared via transesteritication reaction of a precursor obtained from dihydroxy phenol and diphenyl carbonate.

In addition, the polycarbonate resin may be a bisphenol-A polymer having a melting index of 3 to 28 g/10 min (230° C., 2.16 kgf), and preferably, 5 to 15 g/10 min. In the case that the melting index is less than 3 g/10 min, the processing temperature may be too high, and molding may become difficult, and in the case that the melting index is greater than 28 g/10 min, strength may be weakened.

The polycarbonate resin may be a single polycarbonate resin, or may be a mixture with polymethylmethacrylate (PMMA) or polyethylene terephthalate (PET).

(B) Thioether-Based Stabilizer

The thioether-based stabilizer used as a gamma-radiation resistant stabilizer in the present invention is a compound introducing a sulfur functional group and provides rich electrons of sulfur to radicals generated in polycarbonate degraded by the irradiation of gamma-radiation, thereby realizing structural stabilization and preventing yellowing phenomenon exhibited due to the deformation of a terminal group (hydroxyl group) by unstable radicals.

The thioether-based stabilizer may be a compound represented by the following Formula 1.

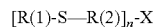

[R(1)-S—R(2)]$_n$-X                    [Formula 1]

In Formula 1, R(1) and R(2) are each independently represent a substituted or unsubstituted carboxylic or heterocyclic aromatic ring, hydroxyl substituted phenylene or naphthalene, an alkyl group with 1 to 20 carbon atoms or a phenyl group, and n is an integer of 1 to 4, where n is 2 to 4, X is an alkyl group with 1 to 5 carbon atoms, an aromatic or nonaromatic ring, oxygen (O), nitrogen (N), phosphor (P) or sulfur (S).

The thioether-based stabilizer as an advantageous compound for realizing structural stabilization by providing electrons to the radicals generated by polycarbonate degraded by the irradiation of gamma-radiation, may include propanoic acid, 3-(dodecylthio)-1,1'-[2,2-bis[[3-(dodecylthio)-1-oxopropoxy]methyl]-1,3-propanediyl]ester, 2,2-bis[[3-(dodecylthio)-1-oxopropoxy]methyl]propane-1,3-diyl bis[3-(dodecyl thio)propionate], tetrakis[methylene-3-(dodecylthio)propionate]-methane, pentaerythritol tetrakis(dodecylthiopropionate), 2,2-bis[[3-(dodecylthio)-1-oxopropoxy]methyl]propane-1,3-diyl, bis[3-(dodecylthio)-propionate, etc., and may preferably include propanoic acid, 3-(dodecylthio)-1,1'-[2,2-bis[[3-(dodecylthio)-1-oxopropoxy]methyl]-1,3-propanediyl]ester or tetrakis[methylene-3-(dodecylthio)propionate]-methane. The thioether-based stabilizer may be used alone or as a mixture of two or more kinds thereof.

A small amount of the thioether-based stabilizer may be added to the polycarbonate resin in an amount ratio of preferably, 0.1 to 2 wt %, more preferably, 0.15 to 1 wt %, and still more preferably, 0.25 to 0.5 wt %. In the case that the amount of the thioether-based stabilizer is less than 0.1 wt %, the improving effect of the yellowing may not be satisfactory, and in the case that the amount is greater than 2 wt %, the improvement of stability with respect to the amount added may be insignificant, and the mechanical properties of a finally obtained resin composition may be unfavorable.

(C) Amide-Based Stabilizer

The amide-based stabilizer used as the gamma-radiation resistant stabilizer in combination with the thioether-based stabilizer is a compound including a nitrogen atom, and possesses electron rich atoms such as sulfur, phosphor, oxygen, etc. The electrons may relieve the yellowing phenomenon generated due to radical electrons at the terminal part of the polycarbonate, generated due to gamma-radiation.

The amide-based stabilizer may be a compound represented by the following Formula 2.

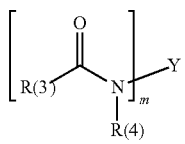

[Formula 2]

In Formula 2, R(3) and R(4) are each independently a substituted or unsubstituted carboxylic or heterocyclic aromatic ring, hydroxyl substituted phenylene or naphthalene, an alkyl group with 1 to 20 carbon atoms or a phenyl group, and m is an integer of 1 to 2, where m is 1, Y is a substituted or unsubstituted carboxylic or heterocyclic aromatic ring, hydroxyl substituted phenylene or naphthalene, an alkyl with 1 to 20 carbon atoms or a phenyl group, and where m is 2, Y is an alkyl group with 1 to 10 carbon atoms, a nonaromatic ring or an aromatic ring.

The amide-based stabilizer as an advantageous compound for relieving the yellowing phenomenon generated due to radical electrons at the terminal part of the polycarbonate degraded by the irradiation of the gamma-radiation may preferably include N,N'-ethylenedi(stearamide), and the stabilizer may be used alone or as a mixture with other amide-based compound.

A small amount of the amide-based stabilizer may be added to the polycarbonate resin in an amount ratio of preferably 0.1 to 2 wt %, more preferably, 0.15 to 1 wt %, and still more preferably, 0.25 to 0.5 wt %. In the case that the amount of the amide-based stabilizer is less than 0.1 wt %, the improving effect of the yellowing may not be satisfactory, and in the case that the amount is greater than 2 wt %, the improvement of stability with respect to the amount added may be insignificant, and the mechanical properties of a finally obtained resin composition may be unfavorable.

As described above, a polycarbonate resin composition with gamma-radiation resistant performance, maintaining the intrinsic high transparency thereof and having improved yellowing phenomenon due to gamma-radiation may be provided by introducing a thioether-based compound including an electron rich sulfur atom and an amide-based compound including a nitrogen atom with electron sharing property as gamma-radiation resistant additives in the polycarbonate resin in the present invention. In addition, a resin composition with the low cost of production may be provided by replacing a common saccharin-based additive with the amide-based compound.

As described above, onto the irradiation of gamma-radiation, the polycarbonate resin in general exhibits yellowing phenomenon, and in order to prevent the yellowing phenomenon, an ester-based or a phthalate-based compound including a double bond that may easily provide electrons in response to the generation of radicals due to the irradiation of the gamma-radiation in the molecular structure thereof may be used, or a compound including a halogen atom that is a single atom such as bromine, chlorine, etc. while possessing a large number of electrons and may stabilize the unstable factor of the radicals. However, the shape of the phthalate-based compound and the compound including a halogen atom are based on bisphenol A (BPA), and the BPA is classified as endocrine disruptor and harmful material in America, Europe, etc. In the present invention, sulfur-based and amide-based compounds, which are not classified as the harmful material and may provide sufficient amount of electrons are introduced so as to produce a polycarbonate resin composition and a molded article having good thermal stability, while maintaining high transparency and stability to the gamma-radiation. The molded article may be very advantageously used in disposable medical devices requiring sterilization such as a disposable syringe, a connector for the connecting part of a nutrient solution, the facial area of an air respirator, a pump for dialysis of kidney and blood, etc.

Meanwhile, the polycarbonate resin composition according to the present invention may further include an additive according to each use within a certain range without deviating from the object thereof. As the additive, a photostabilizer, a slipping agent, a coloring agent, a lubricant, a UV stabilizer, an antioxidant, a coupling reinforcing agent, a thermal stabilizer, a plasticizer, an impact reinforcing agent, etc. may be used alone or as a mixture of at least two thereof. The additive may be added in an amount ratio of 0.1 to 10 parts by weight on the basis of 100 parts by weight of the polycarbonate resin composition.

Hereinafter, particular embodiments according to the present invention will be explained.

First, the specifications of the components used in the examples and comparative examples of the present invention are as follows.

(A) Polycarbonate Resin

A polycarbonate resin of bisphenol-A having MI of 15 g/10 min (Hopelex PC-1150, Lottechem Co.) was used. Here, PC-1070, PC-1100 and PC-1220 produced by the same company may be used, and MI of each product is 7 g/10 min, 10 g/10 min and 22 g/10 min.

(B) Thioether-Based Stabilizer

A commercialized product of tetrakis[methylene-3-(dodecyl thio)propionate]-methane was used.

(C) Amide-Based Stabilizer

A commercialized product of N,N'-ethylenedi(stearamide) was used.

(D) Sulfoneamide-Based Stabilizer

A commercialized product of saccharin was used.

(E) Blue Dye

A commercialized product of Blue PFR (Solusys Inc.) was used.

Comparative Example 1

100 wt % of the polycarbonate resin (A) was used as a polycarbonate composition and a pellet was manufactured using a twin-screw extruder (screw diameter 26 mm, LID 40) at the extrusion temperature of 270 to 300° C. with screw rotating velocity of 200 rpm. After drying at 120° C. for 4 hours using a hot air drier, a specimen was molded using a mold for manufacturing a specimen.

Comparative Example 2

A specimen was manufactured by performing the same procedure described in Comparative Example 1 except for using 99.5 wt % of the polycarbonate resin (A), 0.25 wt % of the thioether-based stabilizer (B) and 0.25 wt % of the sulfoneamide-based stabilizer (D).

Comparative Example 3

A specimen was manufactured by performing the same procedure described in Comparative Example 1 except for using 99.75 wt % of the polycarbonate resin (A) and 0.25 wt % of the thioether-based stabilizer (B).

Comparative Example 4

A specimen was manufactured by performing the same procedure described in Comparative Example 1 except for using 99.5 wt % of the polycarbonate resin (A) and 0.5 wt % of the thioether-based stabilizer (B).

Comparative Example 5

A specimen was manufactured by performing the same procedure described in Comparative Example 1 except for using 99.75 wt % of the polycarbonate resin (A) and 0.25 wt % of the amide-based stabilizer (C).

Comparative Example 6

A specimen was manufactured by performing the same procedure described in Comparative Example 1 except for using 99.5 wt % of the polycarbonate resin (A) and 0.5 wt % of the amide-based stabilizer (C).

Example 1

A specimen was manufactured by performing the same procedure described in Comparative Example 1 except for using 99.5 wt % of the polycarbonate resin (A), 0.25 wt % of the thioether-based stabilizer (B) and 0.25 wt % of the amide-based stabilizer (C).

Example 2

A specimen was manufactured by performing the same procedure described in Comparative Example 1 except for using 99 wt % of the polycarbonate resin (A), 0.5 wt % of the thioether-based stabilizer (B) and 0.5 wt % of the amide-based stabilizer (C).

Example 3

A specimen was manufactured by performing the same procedure described in Comparative Example 1 except for using 98.9995 wt % of the polycarbonate resin (A), 0.5 wt % of the thioether-based stabilizer (B), 0.5 wt % of the amide-based stabilizer (C) and 0.0005 wt % of the blue dye (D).

Example 4

A specimen was manufactured by performing the same procedure described in Comparative Example 1 except for using 98.9993 wt % of the polycarbonate resin (A), 0.5 wt % of the thioether-based stabilizer (B), 0.5 wt % of the amide-based stabilizer (C) and 0.0007 wt % of the blue dye (D).

Experimental Example

In order to evaluate the physical properties of the polycarbonate resin compositions produced according to the present invention, yellowing index (YI) was measured for the specimens according to the above examples and comparative examples, and the results thus obtained are illustrated in the following Table 1.

[Measuring Method]

YI value for each specimen was measured before the irradiation of gamma-radiation, and was measured for each specimen after irradiation of the gamma-radiation. In this case, the gamma-radiation was generated from a cobalt (Co) element with the dose of 5 kGy per hour and the total dose of 25 kGy for 5 hours. With respect to the specimens exposed to the gamma-radiation, the Y values were measured immediately after the irradiation of the gamma-radiation. After storing the specimens in a dark room, YI values were measured again after 1 week, 2 weeks and 3 weeks, respectively. The difference of the YI values measured before and after the irradiation of the gamma-radiation was represented by $dYI_0$, the difference of the YI values before and after 1 week, 2 weeks and 3 weeks after the irradiation of the gamma-radiation was represented by $dYI_1$, $dYI_2$ and $dYI_3$, respectively.

TABLE 1

| YI value | Comparative Example 1 | Comparative Example 2 | Comparative Example 3 | Comparative Example 4 | Comparative Example 5 | Comparative Example 6 | Example 1 | Example 2 | Example 3 | Example 4 |
|---|---|---|---|---|---|---|---|---|---|---|
| Before exposure | 0.17 | 0.75 | 0.5 | 0.41 | 0.8 | 0.79 | 0.57 | 0.66 | −6.33 | −9.12 |
| After exposure | 17.21 | 13.68 | 13.92 | 12.72 | 15.46 | 14.95 | 13.01 | 11.86 | 4.79 | 2.14 |
| After 1 week | 15.32 | 10.96 | 11.83 | 11.06 | 13.37 | 12.84 | 10.22 | 9.03 | 1.64 | −1.51 |
| After 2 weeks | 12.89 | 8.12 | 9.67 | 8.03 | 10.55 | 9.87 | 7.31 | 6.72 | −0.27 | −2.94 |
| After 3 weeks | 11.51 | 6.83 | 7.73 | 7.06 | 8.54 | 8.01 | 6.38 | 5.71 | −1.24 | −3.95 |
| $dYI_0$ | 17.04 | 12.93 | 13.42 | 12.31 | 14.66 | 14.16 | 12.44 | 11.2 | 11.12 | 11.26 |
| $dYI_1$ | 15.15 | 10.21 | 11.33 | 10.65 | 12.57 | 12.05 | 9.65 | 8.37 | 7.97 | 7.61 |
| $dYI_2$ | 12.72 | 7.37 | 9.17 | 7.62 | 9.75 | 9.08 | 6.74 | 6.06 | 6.06 | 6.18 |
| $dYI_3$ | 11.34 | 6.08 | 7.23 | 6.65 | 7.74 | 7.22 | 5.81 | 5.05 | 5.09 | 5.17 |

Referring to Table 1, the stabilization against initial yellowing immediately after the irradiation of the gamma-radiation was effective for the specimens with the thioether-based stabilizer (Comparative Examples 3 and 4) when compared to those without the stabilizer (Comparative Example 1), and the stabilization for a long time period after the irradiation of the gamma-radiation was effective for the specimens with the amide-based stabilizer (Comparative Examples 5 and 6) when compared to those without the stabilizer (Comparative Example 1).

However, the stabilization against yellowing after irradiation of the gamma-radiation was not satisfactory for the specimens with the thioether-based stabilizer (Comparative Examples 3 and 4), however the stabilization against initial yellowing and for a long time period for the specimens with the thioether-based stabilizer and the amide-based stabilizer at the same time was good.

Meanwhile, in the case that the thioether-based stabilizer and the amide-based stabilizer were added at the same time, and a small amount of the blue dye (E) was further added (Examples 4 and 5), the overall YI values were decreased, while maintaining the stabilization against the initial yellowing and for a long time period. Thus, it could be secured that good physical properties could be maintained by the addition of the blue dye without specific side effects.

Although the preferred embodiments have been described in detail, the embodiments of the present invention were for illustration, and it will be readily understood by those skilled in the art that various modifications and changes can be made thereto without departing from the spirit and scope of the present invention defined by the appended claims.

Accordingly, the scope of the present invention may be embodied not by the above detailed description but by the appended claims, and it should be interpreted that all changes or modified shapes derived from the meaning, scope and equivalent concept of the appended claims should be included in the scope of the present invention.

What is claimed is:

1. polycarbonate resin composition, consisting of:
   96 to 99.8 wt % of a polycarbonate resin;
   0.1 to 2 wt % of a thioether-based stabilizer, the thioether-based stabilizer represented by the Formula 1,

[R(1)-S—R(2)]$_n$-X, wherein, [Formula 1]

each of R(1) and R(2) independently represents a substituted or unsubstituted carboxylic or heterocyclic aromatic ring, hydroxyl substituted phenylene or naphthalene, an alkyl group with 1 to 20 carbon atoms or a phenyl group,
   n is an integer of 1 to 4, and
   X is an alkyl group with 1 to 5 carbon atoms, an aromatic or nonaromatic ring, oxygen (O), nitrogen (N), phosphor (P) or sulfur (S); and
   0.1 to 2 wt % of an amide-based stabilizer, the amide-based stabilizer represented by the Formula 2,

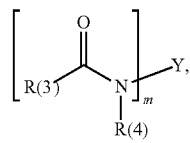
[Formula 2]

wherein,
   each of R(3) and R(4) independently represents a substituted or unsubstituted carboxylic or heterocyclic aromatic ring, hydroxyl substituted phenylene or naphthalene, an alkyl group with 1 to 20 carbon atoms or a phenyl group,
   m is an integer of 1 to 2,
   when m is 1, Y is a substituted or unsubstituted carboxylic or heterocyclic aromatic ring, hydroxyl substituted phenylene or naphthalene, an alkyl with 1 to 20 carbon atoms or a phenyl group, and
   when m is 2, Y is an alkyl group with 1 to 10 carbon atoms, a nonaromatic ring or an aromatic ring,
   wherein the polycarbonate resin composition prevents changing yellow and lowering clarity by irradiation of gamma-radiation.

2. The polycarbonate resin composition of claim 1, wherein a weight average molecular weight of the polycarbonate resin is 2,000 to 200,000.

3. The polycarbonate resin composition of claim 1, wherein the thioether-based stabilizer is at least one selected from the group consisting of propanoic acid, 3-(dodecylthio)-1,1'-[2,2-bis[[3-(dodecylthio)-1-oxopropoxy]methyl]-1,3-propanediyl] ester, 2,2-bis[[3-(dodecylthio)-1-oxopropoxy]methyl]propane-1,3-diyl bis[3-(dodecylthio) propionate], and tetrakis[methylene-3-(dodecylthio) propionate]-methane, pentaerythritol tetrakis (dodecylthiopropionate).

4. The polycarbonate resin composition of claim 1, wherein the amide-based stabilizer is N,N'-ethylenedi(stearamide).

5. molded article molded from the polycarbonate resin composition of claim 1.

* * * * *